(12) United States Patent
Choi et al.

(10) Patent No.: US 7,359,950 B2
(45) Date of Patent: Apr. 15, 2008

(54) METHOD FOR MANAGING NETWORK WHEN MASTER DISAPPEARS

(75) Inventors: Joon-Bo Choi, Sungnam (KR); Woo-shik Kang, Suwon (KR)

(73) Assignee: Samsung Electronics Co., Ltd., Swon-si (KR)

( * ) Notice: Subject to any disclaimer, the term of this patent is extended or adjusted under 35 U.S.C. 154(b) by 720 days.

(21) Appl. No.: 09/904,566

(22) Filed: Jul. 16, 2001

(65) Prior Publication Data
US 2002/0055978 A1    May 9, 2002

(30) Foreign Application Priority Data
Jul. 25, 2000    (KR) ............................... 2000-42866

(51) Int. Cl.
*G06F 15/16*    (2006.01)
(52) U.S. Cl. ....................................... 709/209; 709/208
(58) Field of Classification Search ................ 709/225, 709/208, 209; 714/4, 704; 700/3; 370/395.53, 370/458
See application file for complete search history.

(56) References Cited

U.S. PATENT DOCUMENTS

| | | | | |
|---|---|---|---|---|
| 5,295,137 A | * | 3/1994 | Jurkevich | 370/389 |
| 5,586,338 A | * | 12/1996 | Lynch et al. | 455/433 |
| 5,682,379 A | * | 10/1997 | Mahany et al. | 370/311 |
| 5,835,481 A | * | 11/1998 | Akyol et al. | 370/395.53 |
| 6,061,600 A | * | 5/2000 | Ying | 700/3 |
| 6,092,214 A | * | 7/2000 | Quoc et al. | 714/4 |
| 6,111,889 A | * | 8/2000 | Osada | 370/461 |
| 6,397,260 B1 | * | 5/2002 | Wils et al. | 709/238 |
| 6,415,323 B1 | * | 7/2002 | McCanne et al. | 709/225 |
| 6,493,716 B1 | * | 12/2002 | Azagury et al. | 707/10 |
| 6,683,886 B1 | * | 1/2004 | van der Tuijn et al. | 370/458 |
| 6,701,448 B1 | * | 3/2004 | Akyol et al. | 714/4 |
| 6,836,862 B1 | * | 12/2004 | Erekson et al. | 714/704 |
| 6,975,613 B1 | * | 12/2005 | Johansson | 370/338 |

FOREIGN PATENT DOCUMENTS

JP    53-72403    6/1978

(Continued)

OTHER PUBLICATIONS

Knight et al, RFC 2338, Apr. 1998, Network working group.*

(Continued)

*Primary Examiner*—Kenny Lin
(74) *Attorney, Agent, or Firm*—Sughrue Mion, PLLC

(57) ABSTRACT

A method for managing a network in which Bluetooth equipped devices are linked together when the network master cannot serve as a master. During normal operation, the network master updates the backup master rank information when the network master disappears, in a predetermined cycle, according to link information, such as received signal strength indication (RSSI) or link quality, transmitted from the Bluetooth equipped devices serving as a slave. When power of the network master is exhausted, or when the network master leaves the network operating region, a new master is selected from the remaining slaves according to the backup master rank information, thereby reconfiguring a network around the new network master. The method enables proper designation of a new master when a preexisting network master leaves the network operating region, thereby increasing a probability of holding connection throughout the network.

13 Claims, 11 Drawing Sheets

| | FOREIGN PATENT DOCUMENTS | |
|---|---|---|
| JP | 1-256843 | 10/1989 |
| JP | 3-283846 | 12/1991 |
| JP | 5-225161 | 9/1993 |
| JP | 7-123107 | 5/1995 |
| JP | 8-88641 | 4/1996 |
| JP | 9-200811 | 7/1997 |
| JP | 11-346215 | 12/1999 |
| JP | 2000-049738 | 2/2000 |
| JP | 2000-101586 | 4/2000 |
| JP | 2000-216782 | 8/2000 |
| JP | 2000-295252 | 10/2000 |
| JP | 2000-349794 | 12/2000 |
| JP | 2001-168892 | 6/2001 |
| KR | 1996-0016295 | 5/1996 |
| WO | WO 98/21854 A1 | 5/1998 |
| WO | WO 01/03379 A1 | 1/2001 |

OTHER PUBLICATIONS

Text of the First Office Action, Chinese Patent Application No. 01119547.9, pp. 4-7, no date.*

"Bluetooth Specification Version 1.0 B, Core, Baseband Specification, Channel Control" Specification of the Bluetooth System, vol. 1, Dec. 1, 1999, pp. 96-126, XP 002174708.

"Bluetooth Specification Version 1.0 B, Core, Link Manager Protocol" Specification of the Bluetooth System, vol. 1, Dec. 1, 1999, pp. 185-244, XP002174828.

Haartsen J: "Bluetooth-The Universal Radio Interfce for Ad Hoc Wireless Connectivity" Ericsson Review, Ericsson. Stockholm, SE, No. 3, 1998, pp. 110-117, XP000783249.

* cited by examiner

METHOD FOR MANAGING NETWORK WHEN MASTER DISAPPEARS

BACKGROUND OF THE INVENTION

1. Field of the Invention

The present invention relates to a method for managing a network in which Bluetooth equipped devices are linked together, and more particularly, to a method for managing a network by a backup master when the master of the network cannot serve as a master in the network operating region. The present application is based on Korean Patent Application No. 2000-42866, which is incorporated herein by reference.

2. Description of the Related Art

Bluetooth technology relates to a wireless communications method having no centralized control function, in which wireless transmission and reception of data between Bluetooth equipped devices are established in a local area, without cables. Although one-to-one or one-to-multi connection can be established, due to the lack of the centralized control function, the Bluetooth technology has not been applied in a network. To manage Bluetooth equipped devices in a network, one of the Bluetooth equipped devices must be designated as a master of the network, i.e., the Bluetooth piconet.

Referring to FIGS. 1 and 2, in a conventional method for designating a master and slaves in a network in which a plurality of Bluetooth equipped devices are linked together, when power is applied to a Bluetooth equipped device, a network manager 160 of the Bluetooth equipped device inquires as to whether any Bluetooth equipped device exists within a radio coverage region (S212). The network manager 160 determines whether the response from any Bluetooth equipped device is detected (S214). The network manager 160 of the Bluetooth equipped device, to which power is applied, serves as the master or a slave of the network according to whether there is a response or not in step S214. In particular, if there is no response to the inquiry in step S214, the network manager 160 sets a master mode, and performs inquiry scan (S216) and page scan (S218). The network manager 160 chosen as the network master checks whether any Bluetooth equipped device attempts to establish a connection (S220). If yes, the network manager 160 accepts the request for connection, and requests the Bluetooth equipped device, which requests connection, to change its role to a slave, while the network manager 160 remains as the master of the network (S222). Then, the network manager 160 transfers information on itself, as the network master, and information on other slaves, to the new slave linked to the network. The network manager 160 also stores information on new slaves or the slaves which have left the network, such as addresses or names of the slaves, and announces the stored information to the other slaves linked to each other throughout the network (S224).

Meanwhile, in step S220, if there is no connection request from any Bluetooth equipped device, a determination as to whether to change the mode is made (step S226). The mode can be changed when a user wants to modify a role of the Bluetooth equipped device from the master to a slave, when the Bluetooth function is switched off, or when power is turned off. If it is determined in step S226 to keep the master mode, the process returns to step S216 to continue its role as the network master. In contrast, if it is determined in step 226 to change the mode, the master mode is expired.

Meanwhile, in step S214, if a response to the inquiry is detected in step S214, this means that a preexisting network exists within the radio coverage region. In this case, in order to enter the preexisting Network, the network manager 160 pages the master of the preexisting Network to establish a connection (S232). If the connection is established, the network manager 160 changes its role to a slave with respect to the master of the preexisting network (S234). Next, the network manager 160 receives information on the other slaves of the preexisting network from the network master (S236), thereby terminating the designation of master or slave in the network. After the role of the Bluetooth equipped device is designated as a slave, and when the slave does not communicate with other Bluetooth equipped devices, the mode is changed to a park mode. In the park mode, the slave receives information from the new network master to update its old network information. In contrast, if the Bluetooth equipped device, a new slave NS, whose role is changed as a slave attempts to communicate with another slave within the network, the new slave NS requests the network master to cut off the connection with the corresponding slave CS, communicates with the corresponding slave CS, and then cuts off the connection with the corresponding slave CS in order to return into the network.

As described previously, the Bluetooth equipped device can serve as the master or a slave in the network depending on the response to the inquiry. The network consisting of Bluetooth equipped devices allows entering of new Bluetooth equipped devices into the network, sharing information with other Bluetooth equipped devices in the network, and communication among any Bluetooth equipped device of the network in response to a request of any of the Bluetooth equipped devices.

However, there is a need for designating a new master or reconfiguring the network when the network master cannot serve as a master at a point of time, for example, when power is exhausted or the master leaves the network operating region.

SUMMARY OF THE INVENTION

To solve the above problems, it is a first objective of the present invention to provide a method for building up rank information on a backup master for use in selecting a new master of a network, when a preexisting network master no longer remains as a master in the network at a point of time.

A second objective of the present invention is to provide a method for designating a new master of the network according to the backup master rank information, when a preexisting network master no longer remains in its role in the network at a point of time.

A third objective of the present invention is to provide a method for establishing connections between the new master of the network and the remaining slaves, when a preexisting network master no longer remains in its role in the network at a point of time.

The above objects are accomplished by a method for building up backup master information, including the steps of (a) receiving connection information from at least one slave of a network; (b) determining a priority of a slave to be used as the backup master when a network master disappears, according to the connection information; and (c) announcing the determined priority information of the backup master to at least one slave.

The steps (a) through (c) are repeated in a predetermined cycle.

The connection information includes received signal strength indication (RSSI) and/or link quality information.

In the step (b), a slave having higher RSSI is given a higher priority, which is used to choose a new network master.

In step (b), a slave having higher link quality value is given a higher priority for being chosen as a new network master.

The network is a Personal Ad-hoc Network.

The step (c) announces the determined priority information of a backup master to at least one slave through a broadcasting channel.

The above objects are also accomplished by a method for designating a new master of a network when a preexisting network master disappears, including the steps of (a) determining whether the preexisting network master disappears; (b) if the preexisting network master disappears, determining a rank indicating an order for choosing the new network master, which is received before the disappearance of the preexisting network master; and (c) changing a role to the new network master, if the rank is the highest.

It is preferable that the step (d) of performing inquiry scan and page scan is provided.

The method for designating a new master of a network when a preexisting network master disappears also includes the steps of (e) determining whether a new device attempts to establish a connection within the network; (f) accepting the request of the new device for connection, requesting the new device to change to a role as a slave, and remaining as the new network master; (g) storing information of the new device, and announcing the information of the new network master and each slave linked throughout the network, to each of the slaves linked throughout the network; and (h) checking for a change to the master mode if there is no connection request from a new device in step (e), returning to the step (d) when there is no change to the master mode, and terminating the master mode when there is a change to the master mode.

In step (h), the change to the master mode is determined when the role of the device serving as the network master is changed to a slave by a user, when the Bluetooth function of the master is switched off, or when power of the master is turned off.

The step (a) includes the sub-steps of (a1) checking a connection status with the preexisting network master; (a2) attempting to reconnect with the preexisting network master if disconnection is detected in sub-step (a1); (a3) checking whether reconnection with the preexisting network master is successful, and returning to the sub-step (a1) if the reconnection with the preexisting network master is successful; and (a4) determining the disappearance of the preexisting network master if reconnection with the preexisting network master is not established in sub-step (a3), and informing a host of the event as a "Disconnection Complete Event".

The sub-step (a1) is repeated in a predetermined cycle, while the connection with the preexisting network master remains.

The above objects are also accomplished by a method for establishing a connection between a new master and remaining slaves of a network when a preexisting network master disappears, including the steps of (a) checking whether the preexisting network master disappears; (b) checking backup master rank information, when determining the disappearance of the preexisting network master in step (a); (c) attempting to establish a connection with the new network master when determining non-highest priority, according to the backup master rank information; and (d) remaining as a slave if a connection with the new network master is established in step (c).

The method according to the present invention enables proper designation of a new master when a preexisting network master leaves the network operating region, thereby increasing a probability of holding connection throughout the network.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE INVENTION

Figure 1:
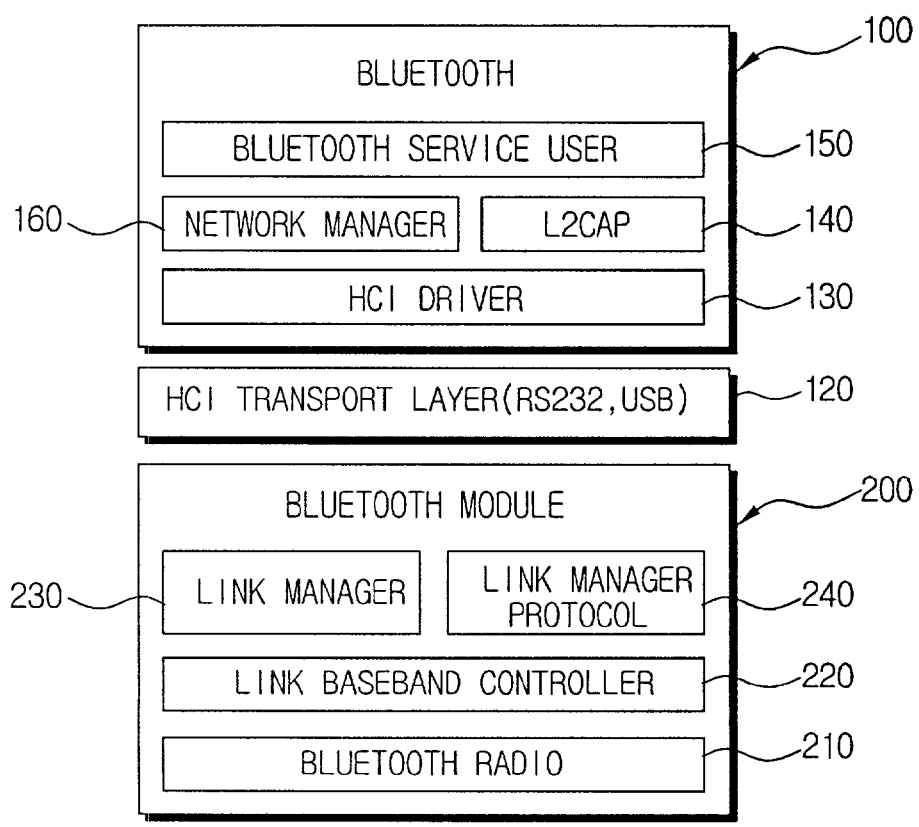
FIG. 1 is block diagram of a Bluetooth system capable of constructing a network.

A method for designating a new master of a network when a preexisting network master disappears, according to the present invention, contributes to increasing a probability of holding connection throughout the network. Preferred embodiments of the present invention will be described with reference to the appended drawings. In the drawings, like reference numerals are used to refer to like elements throughout.

FIG. 1 is a block diagram of a Bluetooth system capable of configuring a network. In FIG. 1, a Bluetooth module 200 is a separate unit connected to a Bluetooth equipped device (hereinafter, referred to as Bluetooth host 100) through a cable, compliant with the wired serial communications standard. An HCI (Host Controller Interface) transport layer 120, which is RS232C or USB (Universal Serial Bus), controls the Bluetooth module 200 according to a series of commands prescribed in the standard and their responses, and performs data transmission and reception between the Bluetooth host 100 and the Bluetooth module 200.

A L2CAP (Logical Link Control and Adaptation Protocol) 140, which is a standard communications protocol, multiplexes a variety of protocols in upper layers. A HCI driver 130 allows transmission of HCI standard commands and receives the responses thereto, and transmits and receives data through the L2CAP 140. A Bluetooth service user 150 is a Bluetooth service application. A network manager 160 serves to manage the network by integrating devices equipped with the Bluetooth module 200 into the single network. The network manager 160 interfaces with a user application program. The level of the network manager 160 is equal to the upper level of the L2CAP 140. Thus the network manager 160 manages the network using the L2CAP 140, through communications with the network manager of a network master.

A link manager 230, which is located in the Bluetooth module 200, performs the commands transmitted from the Bluetooth host 100 through the HCI transport layer 120 and notifies the Bluetooth host 100 of the result. The link manager 230 manages the overall operation of the Bluetooth module 200 by controlling a link baseband controller 220 and a Bluetooth radio 210. Here, the link manager 230 uses link manager protocol (LMP) 240 for communications with the link manager of another Bluetooth equipped device. The link baseband controller 220 operates according to the command of the link manager 230. The Bluetooth radio 210 wirelessly transmits information according to standard specifications.

Figure 2:
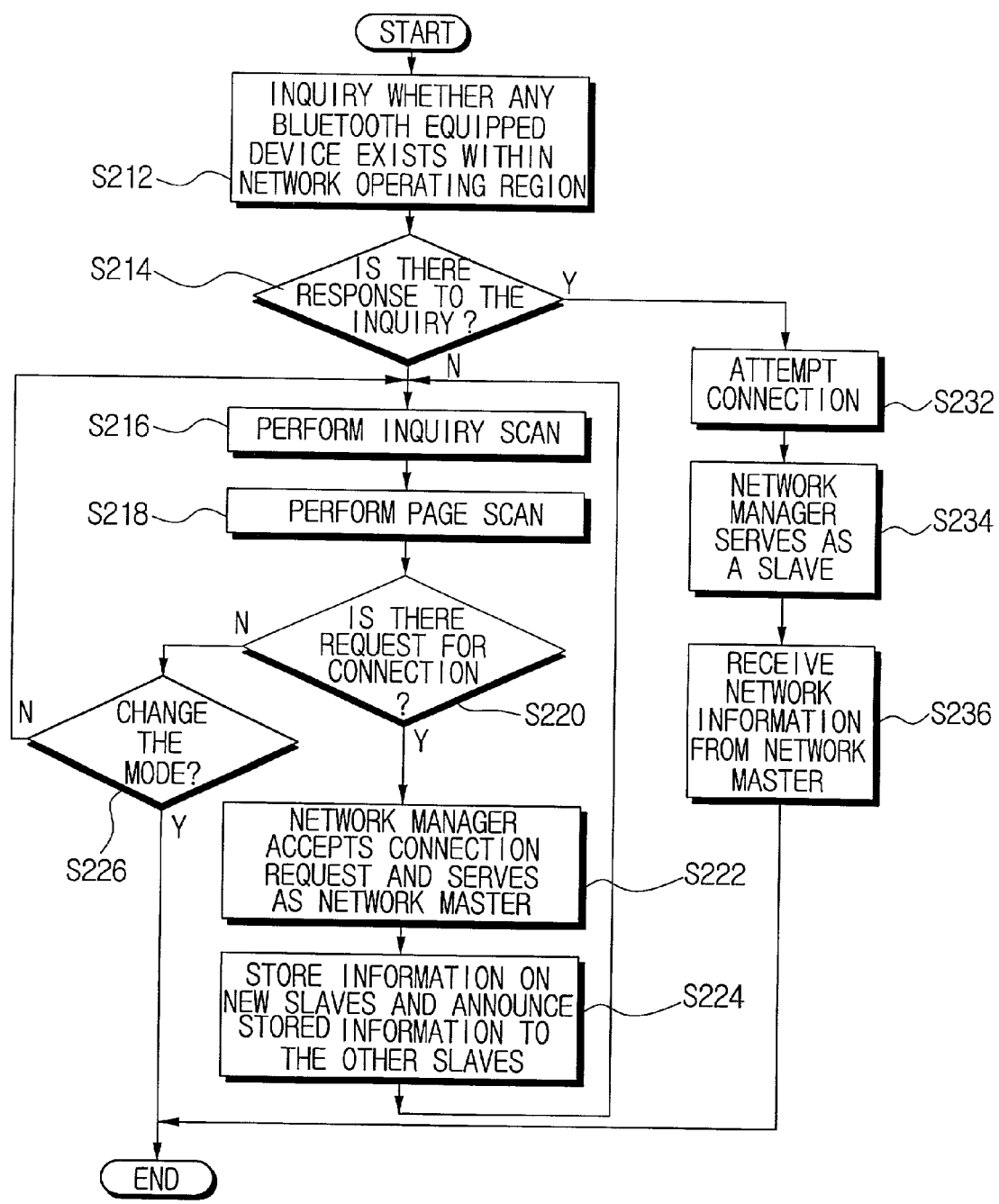
FIG. 2 is a flowchart illustrating a conventional method for designating a Bluetooth equipped device as the master or slave of a network.
Figure 3:
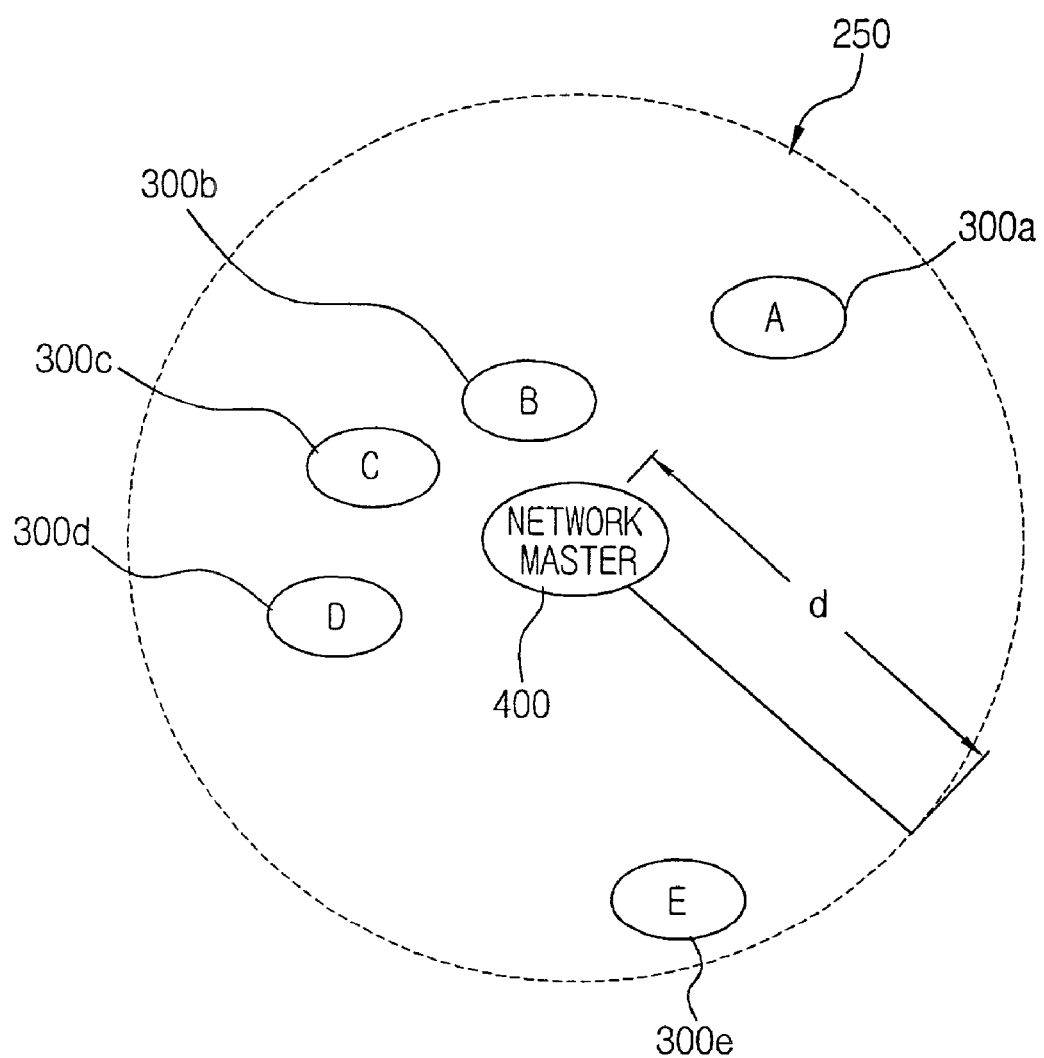
FIG. 3 illustrates the configuration of a network in which Bluetooth equipped devices are linked together.

FIG. 2 is a block diagram of a Bluetooth system capable of constructing a network. FIG. 3 illustrates the configuration of a network in which Bluetooth equipped devices are linked together. It is assumed that Bluetooth equipped devices are designated as a master or slaves by the method of FIG. 2, and distributed as shown in FIG. 3. In general, whether wireless communication is successful or not is determined by the power of transmitted waves or the sensitivity of received waves. In the present embodiment, the network consists of a network master 400 and network slaves 300, i.e., A 300a, B 300b, C 300c, D 300d and E 300e. As shown in FIG. 3, the network slaves 300 are located around the network master 400, within the radio coverage. In the Bluetooth wireless communication field, a standard radio coverage is defined as 10 m. Thus, a maximum allowable distance between the network master 400 and a network slave 300 is 10 m. In FIG. 3, the circle 250, enclosed by dashed lines, is a region with a radius d corresponding to the maximum radio coverage from the network master 400. Bluetooth equipped devices located in the circle 250 can be configured as a network with a network master 400.

Figure 4:
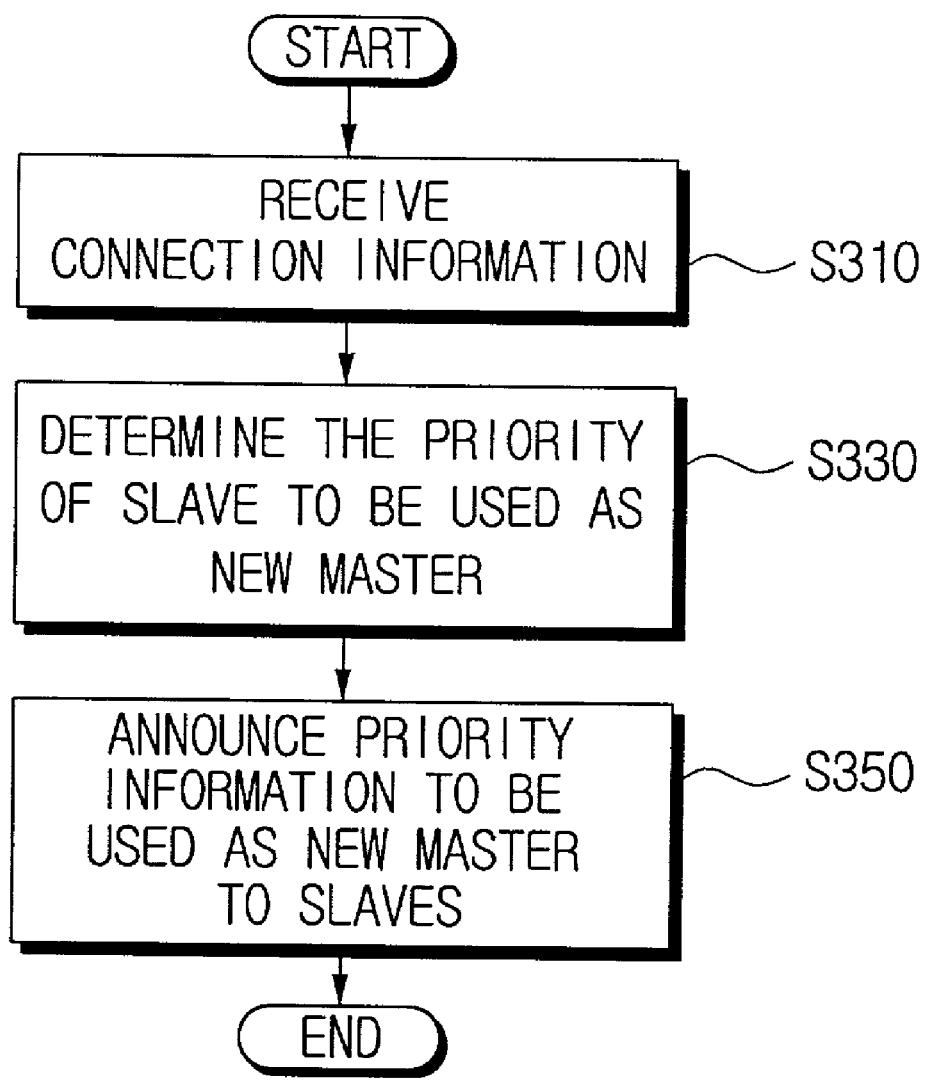
FIG. 4 is a flowchart illustrating a method for building up information on backup masters in a network, according to the present invention.

FIG. 4 illustrates a method for building up information on backup masters in a network, according to the present invention. Referring to FIGS. 3 and 4, the network master 400 receives connection information from the network slaves 300, i.e., A 300a, B 300b, C 300c, D 300d and E 300e, in order to check the connection status with each of the network slaves 300 in the network (S310). The connection information includes received signal strength indication (RSSI) and/or link quality. The RSSI, which is measured by each slave and provided to the network master 400, is closely related to the distances between each of the network slaves 300 and the network master 400. The link quality information is an index of error rate in data transmission between the network master 400 and each slave, and is associated with the distance between the master 400 and each of the network slaves 300, and the presence or absence of obstructions therebetween. Network slaves 300 can read the RSSI value of a signal transmitted from the network master 400 using an HCI command, "Read-RSSI", prescribed in the Bluetooth standard. Network slaves 300 also get 1-byte numeric link information using a standard HCI command, "Get_Link_Quality". The higher the RSSI and link quality values, the better the connection status. The network master 400 determines the rank information of a backup master to be chosen as a new network master 400 when the preexisting network master leaves the network operating region, based on the connection information (S330). In the present embodiment, the rank information on the backup masters more likely to be chosen as a new network master is determined according to RSSI and/or link quality values. That is, a slave having higher RSSI and/or link quality values is given a higher rank as a backup master in order to be chosen as a new network master. This increases the probability of reconfiguring a network with the remaining slaves when a preexisting network master leaves the network operating region. After the rank of the backup master, which is used for choosing a new network master, is determined with respect to all the slaves in step S330, the network master 400 announces the rank information of the backup master determined in step S330, to each slave through a broadcasting channel (S350).

The network master 400 determines the new backup master rank information, which is used for choosing a new network master with respect to the slaves, every predetermined cycle, and announces the result to all of the network slaves 300. This is done in consideration of RSSI variations due to a change in location of the network master 400 and/or network slaves 300, and link quality variations due to, for example, the presence or absence of obstructions between the network master 400 and network slaves 300, or a change in other conditions.

Figure 5:
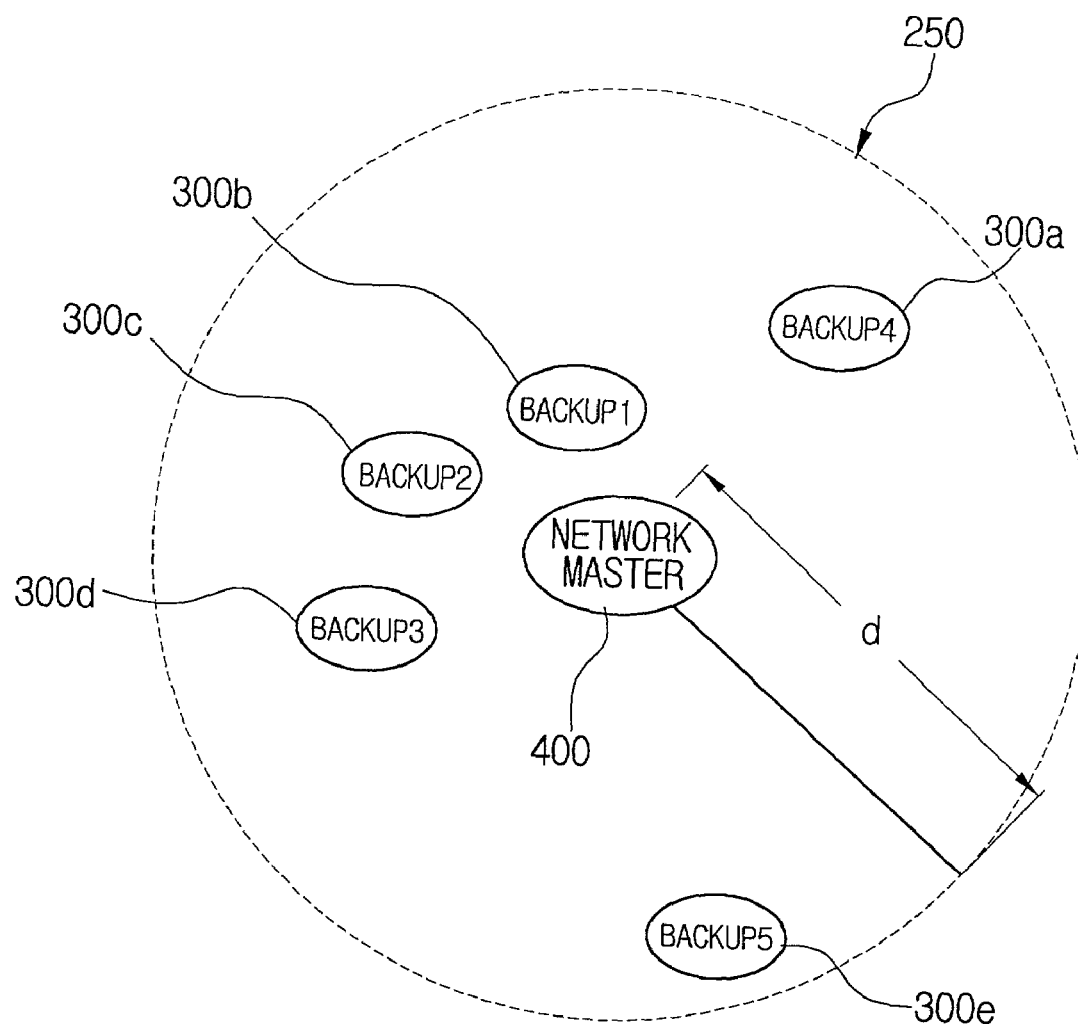
FIG. 5 illustrates the backup master rank information of each slave used to choose a new network master, which is determined by the method of FIG. 4.
Figure 6:
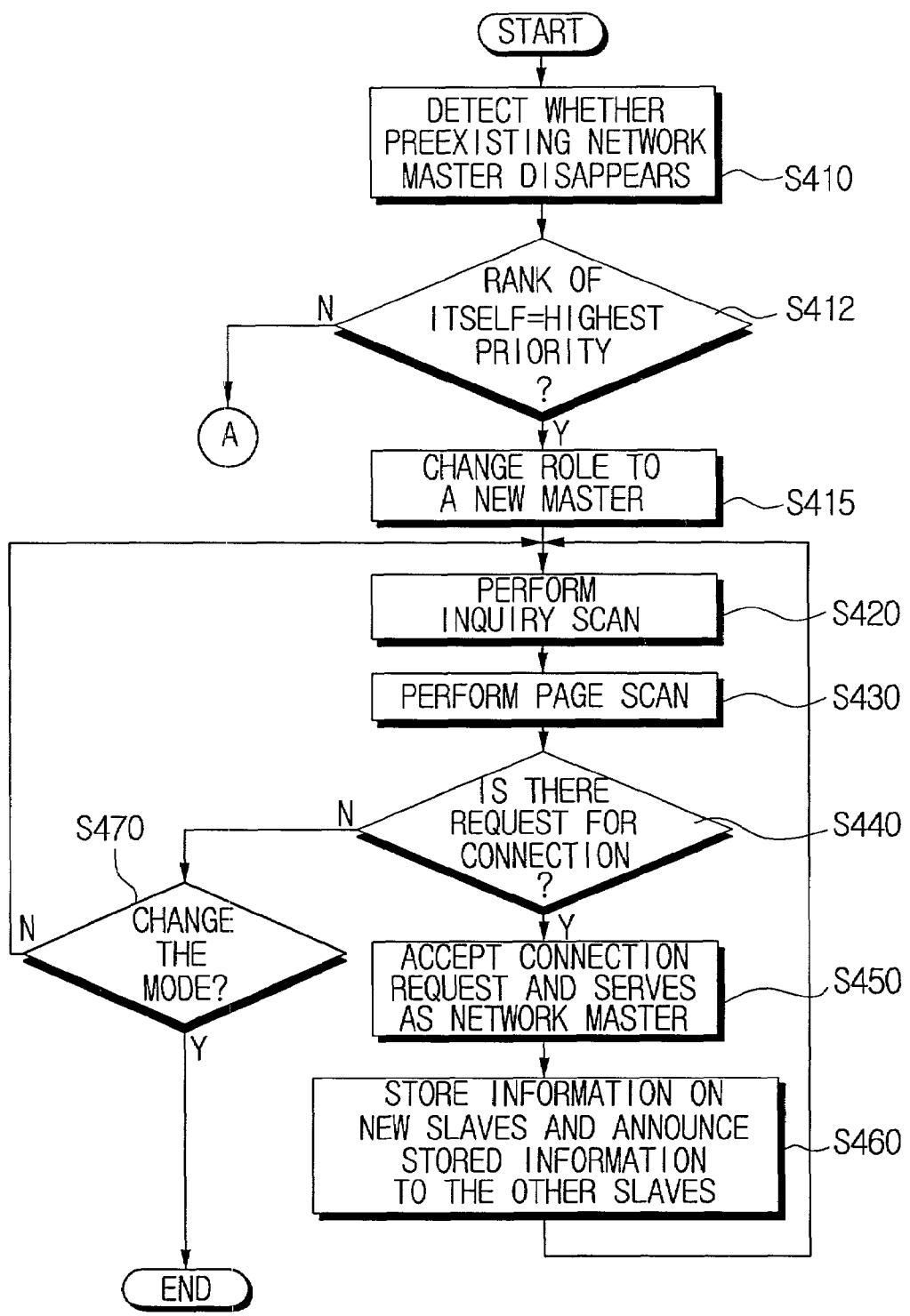
FIG. 6 is a flowchart illustrating a method for designating a new master, according to the backup master rank information, in order to reconstruct the network when the preexisting network master leaves the network operating region.
Figure 7:
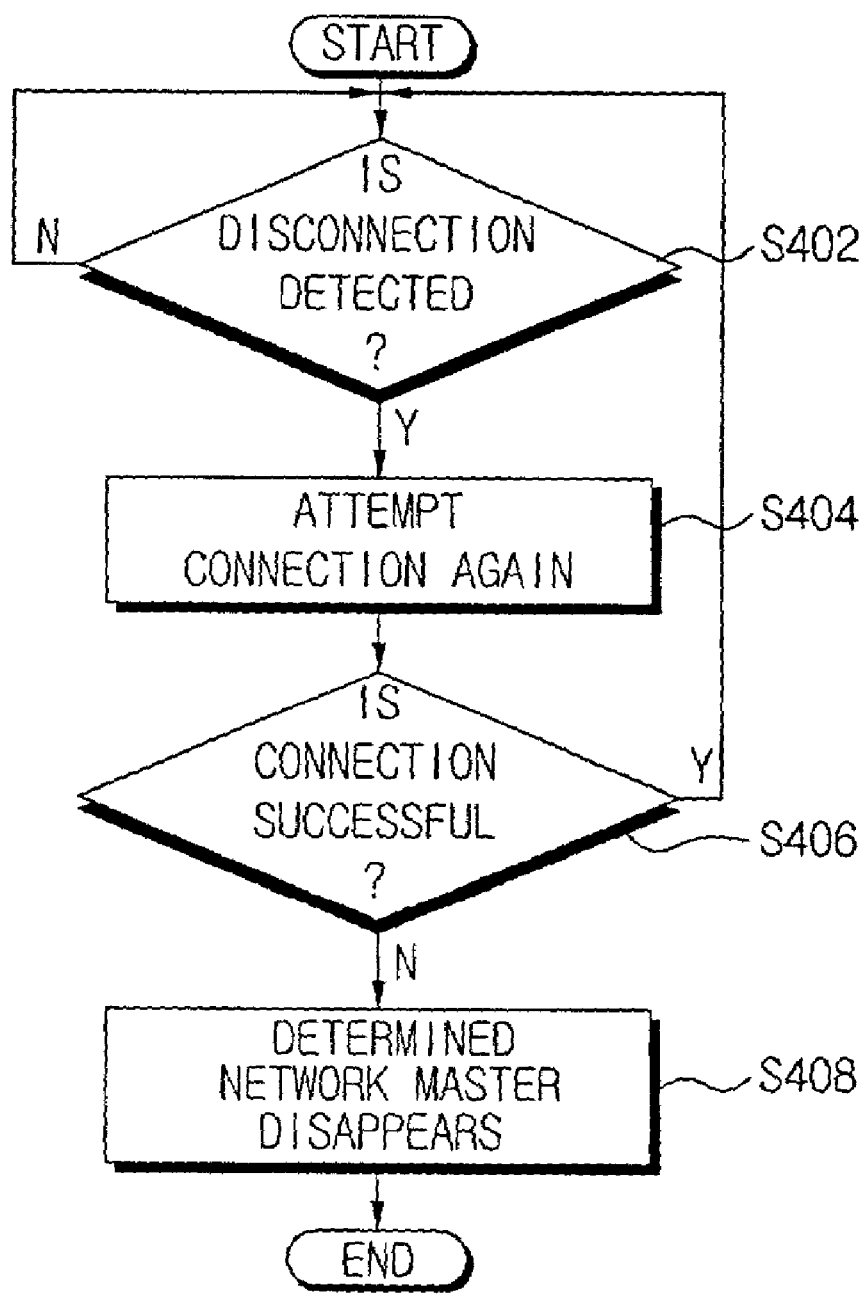
FIG. 7 is a flowchart illustrating in detail the step of detecting when the preexisting network master of FIG. 6 leaves.

FIG. 5 illustrates the backup master rank information used for choosing a new network master with respect to the slaves in the network, which is determined by the method illustrated with reference to FIG. 4. As shown in FIG. 5, slave A 300a is designated as the fourth ranked backup master BACKUP 4, slave B 300b is designated as the first ranked backup master BACKUP 1, slave C 300c is designated as the second ranked backup master BACKUP 2, slave D 300d is designated as the third ranked backup master BACKUP 3, and slave E 300e is designated as the fifth ranked backup master BACKUP 5. When power of the preexisting network master 400 is exhausted or the preexisting network master 400 leaves the network operating region, a network is reconfigured with the remaining network slaves 300 by designating a new master according to the rank information of the backup master more likely to be chosen as a new network master.

A method for reconfiguring a network when a preexisting network master leaves the network operating region will now be described with reference to FIGS. 6 through 9. After the rank information of the backup master more likely to be chosen as a new network master is determined as illustrated in FIG. 5, each of the network slaves 300 A, B, C, D and E determines whether the preexisting network master 400 leaves the Network operating region (S410). Step S410 involves the sub-steps illustrated in FIG. 7. The determination as to whether the preexisting network master 400 leaves the network operating region 250 is achieved by detecting a disconnection between the preexisting network master 400 and each of the slaves. According to the Bluetooth standard version 1.0, Bluetooth equipped devices monitor the mutual connection status every cycle, for example, in a period of 0.625 ms-40.9 sec, with a link supervision timer. Based on this, the network slaves 300 check their connection status with the network master 400 (S402). The cycle of monitoring the connection status with the network master can be determined according to the values of the link supervision timer. The network slaves 300 periodically check the connection status with the network master 400 using the link supervision timer. In step S402, if connections between the network master 400 and network slaves 300 are maintained, the network slaves 300 continue to monitor the connection status with the network master 400 every predetermined cycle. However, if a disconnection between the network master 400 and network slaves 300 is detected in step S402, a corresponding slave attempts to establish reconnection (S404). Next, the corresponding slave checks for whether reconnection with the network master 400 is established (S406). If yes, the process returns to step S402. In contrast, if reconnection between the network master 400 and the corresponding slave is not established, the corresponding slave determines the event as that the network master 400 left the network operating region, and informs the Bluetooth host of "Disconnection_Complete Event" (S408).

Referring back to FIG. 6, when the absence of the network master 400 in the network operating region is identified, each of the slaves checks for backup master rank information, which is used to choose a new network master (S412). In step S412, each of the network slaves 300 checks for whether its rank is given the highest priority in order to be chosen as a new network master. If so, the corresponding slave changes its role to a new master (S415). The new master performs inquiry scan (S420) and page scan (S430). Next, the new master checks whether any Bluetooth equipped device attempts to establish a connection thereto (S440). If yes, the network master accepts the request for connection of a Bluetooth equipped device. The new master requests the Bluetooth equipped device to set its role to a slave, and the new master remains in its role as the network master (S450). Then, the new master stores information on the newly entering slave and announces information on the other slaves as well as its own information, to the new slave. In addition, the new master also stores information on other new slaves that enter the network operating region or the slaves that leave the network operating region, such as the addresses or names of the slaves, etc., and announces the stored information to the other slaves (S460).

Meanwhile, in step S440, if there is no connection request from any Bluetooth equipped device, a determination of whether to change the mode is made (S470). The mode can be changed when a user intends to change the role of the Bluetooth equipped device from the master to a slave, when the Bluetooth function is switched off, or when power is turned off. In step S470, if there is no request for mode change, the process returns to step S420 to continue its role as the network master. In contrast, if a determination is made in step 470 to change the mode, the master mode is ended. When a preexisting network master leaves the network operating region, a new master of the network is chosen and performs its role, as described above.

Figure 8:
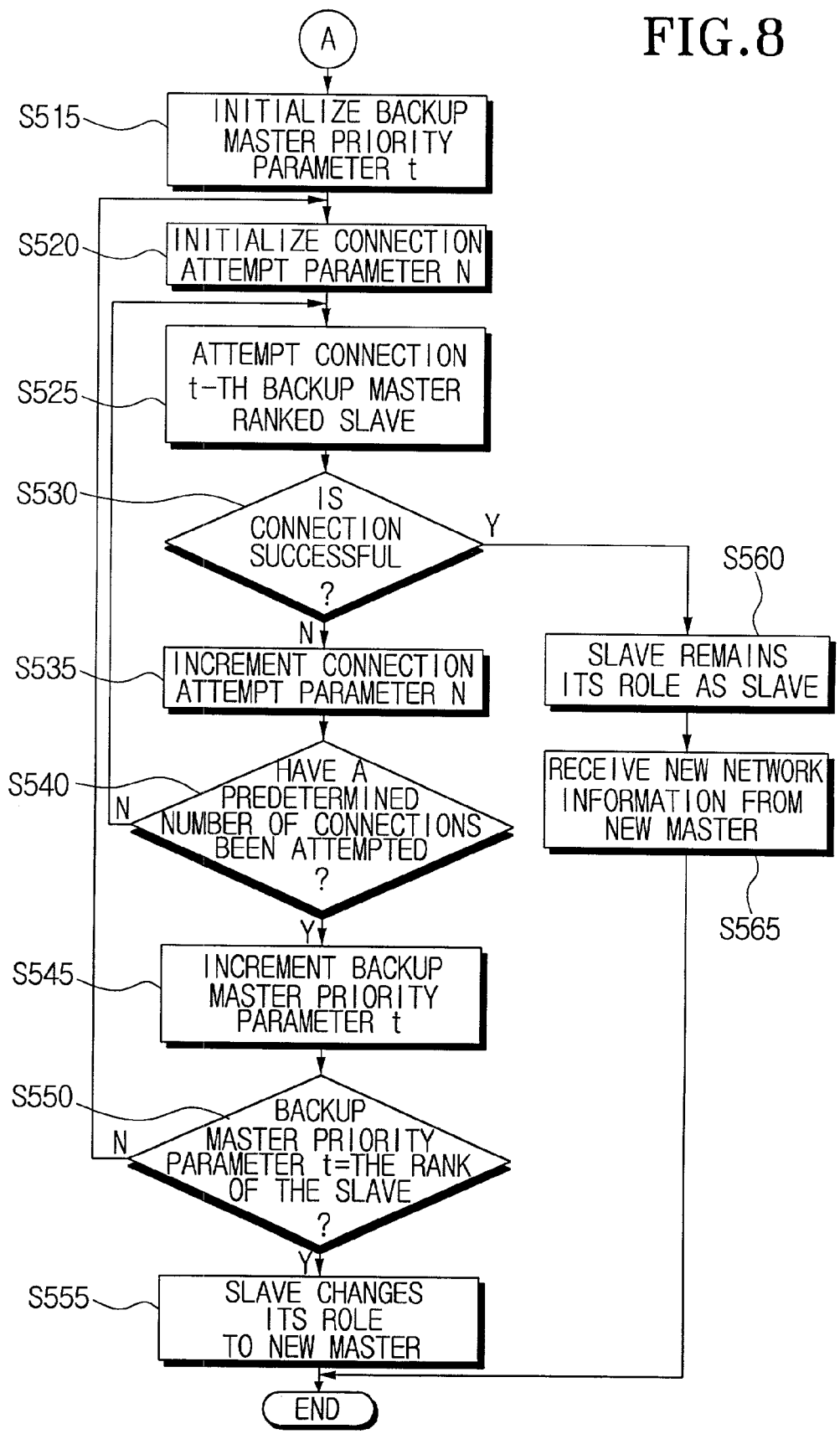
FIG. 8 is a flowchart illustrating a method for establishing connections between a new master and remaining slaves when a preexisting network master disappears.

Meanwhile, in step S412, if the rank information of the backup master of the slave is not the highest priority, the process A as shown in FIG. 8 is as follows. The slave initializes a parameter t indicating the rank of the backup master (S515), and a parameter N indicating the number of connections attempted (S520). After the connection attempt parameter N is initialized, the slave attempts to establish a connection with the slave designated as the t-th ranked backup master (hereinafter t-th ranked slave)(S525), and checks for whether the connection with the t-th ranked slave is established (S530). In step S530, if the connection is successful, then the slave designated as the t-th ranked slave in a new network, remains as a slave (S560) and receives new network information from the new master (S565). When each of the Bluetooth equipped devices that maintain their roles as a slave in the new network do not communicate with other slaves, they change their current mode to a park mode, and update their own network information with the new version of information provided by the new network master. Meanwhile, if any of the Bluetooth equipped devices serving as a slave desire to communicate with another slave in the Network, the Bluetooth equipped devices can request the new network master to end the connection with the slave to which the Bluetooth equipped devices attempts to connect, communicate with the slave, and then end the connection with the slave in order to return into the network.

Meanwhile, in step S530, if the connection between the corresponding slave and the t-th ranked slave is not established, then the corresponding slave increments the connection attempt parameter N (S535) and checks whether a predetermined number of connections have been attempted (S540). In step S540, if the connection attempt parameter N is smaller than the predetermined number of connections attempted, the corresponding slave continues to attempt connection with the t-th ranked slave (S525). Otherwise, if the predetermined number of connections have been attempted in step S540, the corresponding slave increments the backup master rank parameter t (S545), and compares the increased backup master rank parameter t with its rank, used for choosing a new master (S550). In step S550, if the increased backup master rank parameter t is not the same as the rank of the corresponding slave, the process returns to step S520. Otherwise, the slave changes its role to a new network master 400 (S555).

Figure 9:
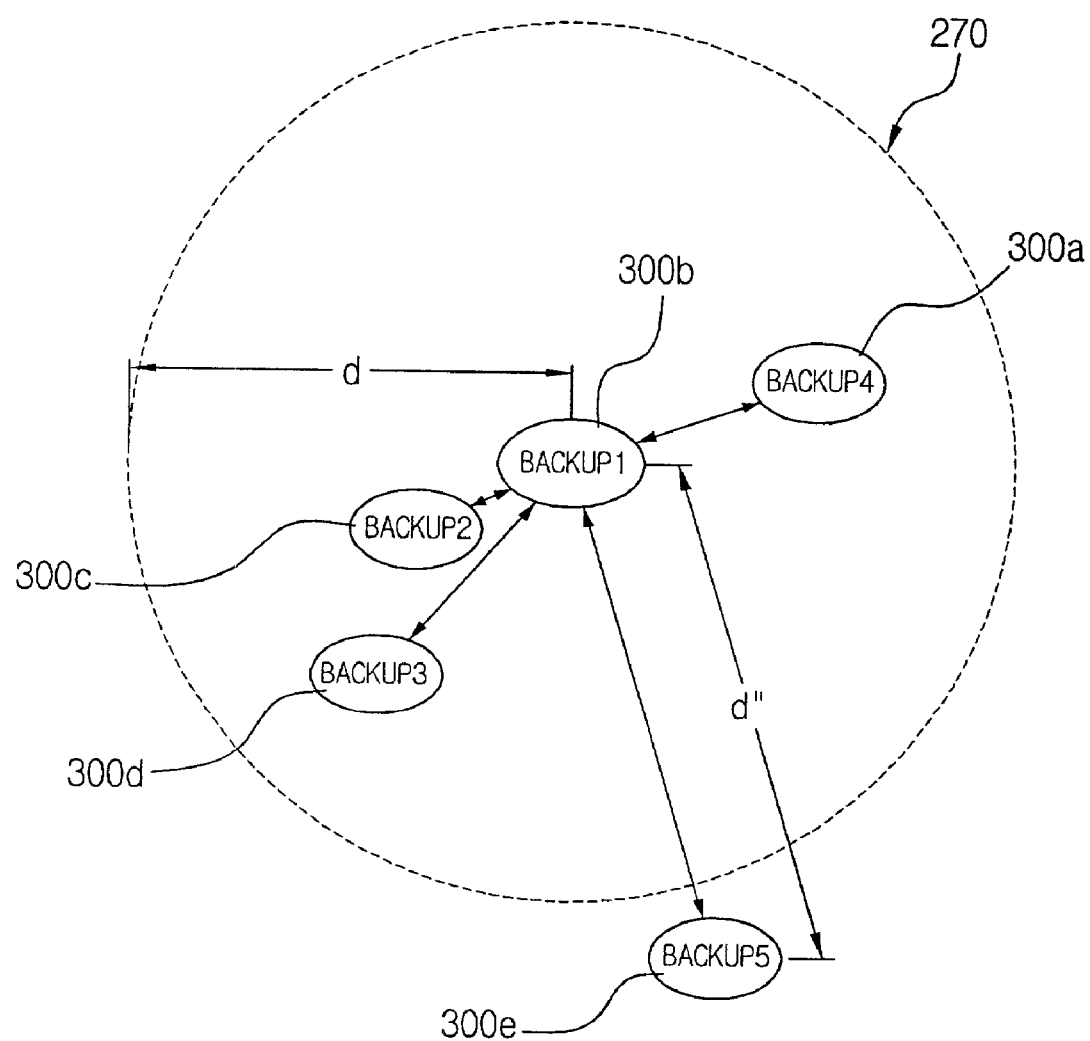
FIG. 9 illustrates the configuration of a Network reconstructed after the preexisting network master disappears.
Figure 10:
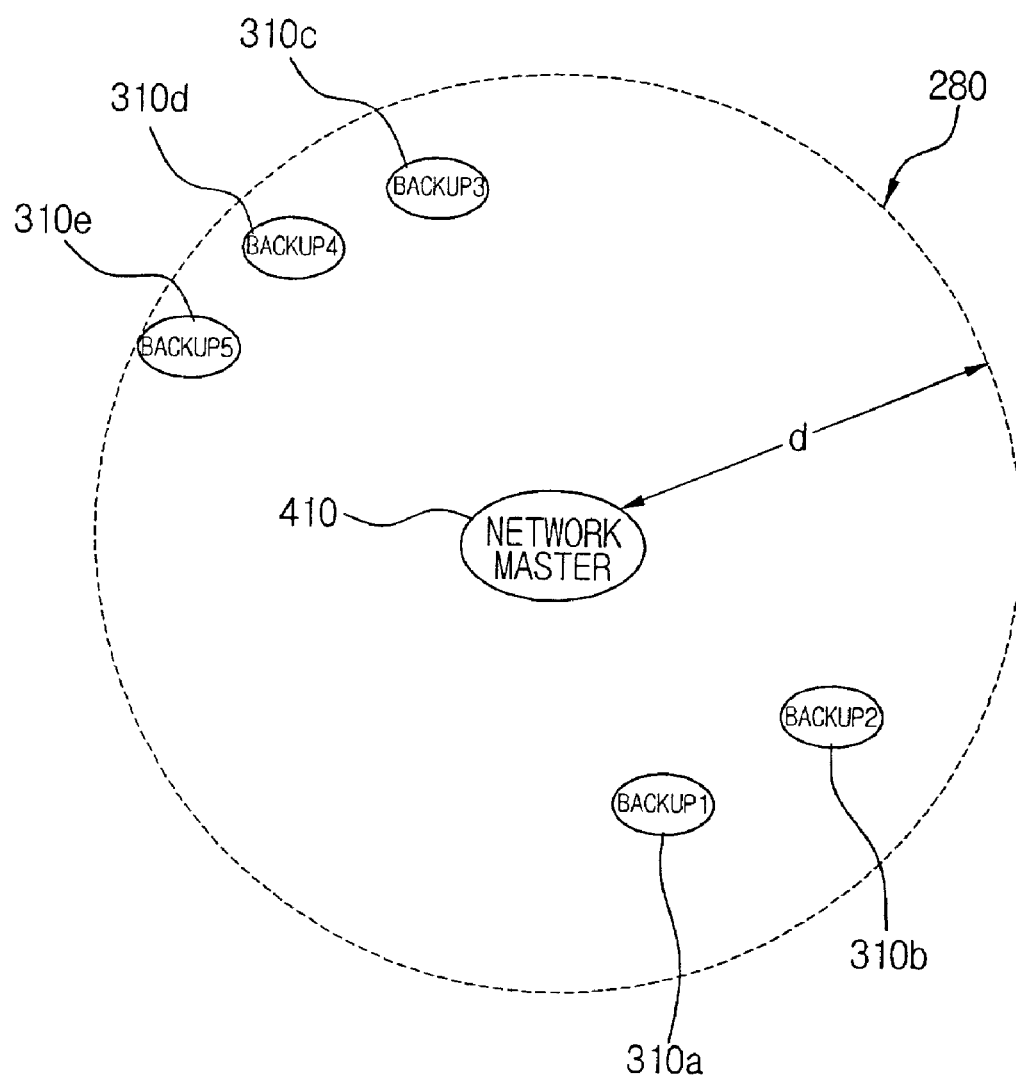
FIG. 10 illustrates the configuration of another network through which Bluetooth equipped devices are connected together.
Figure 11:
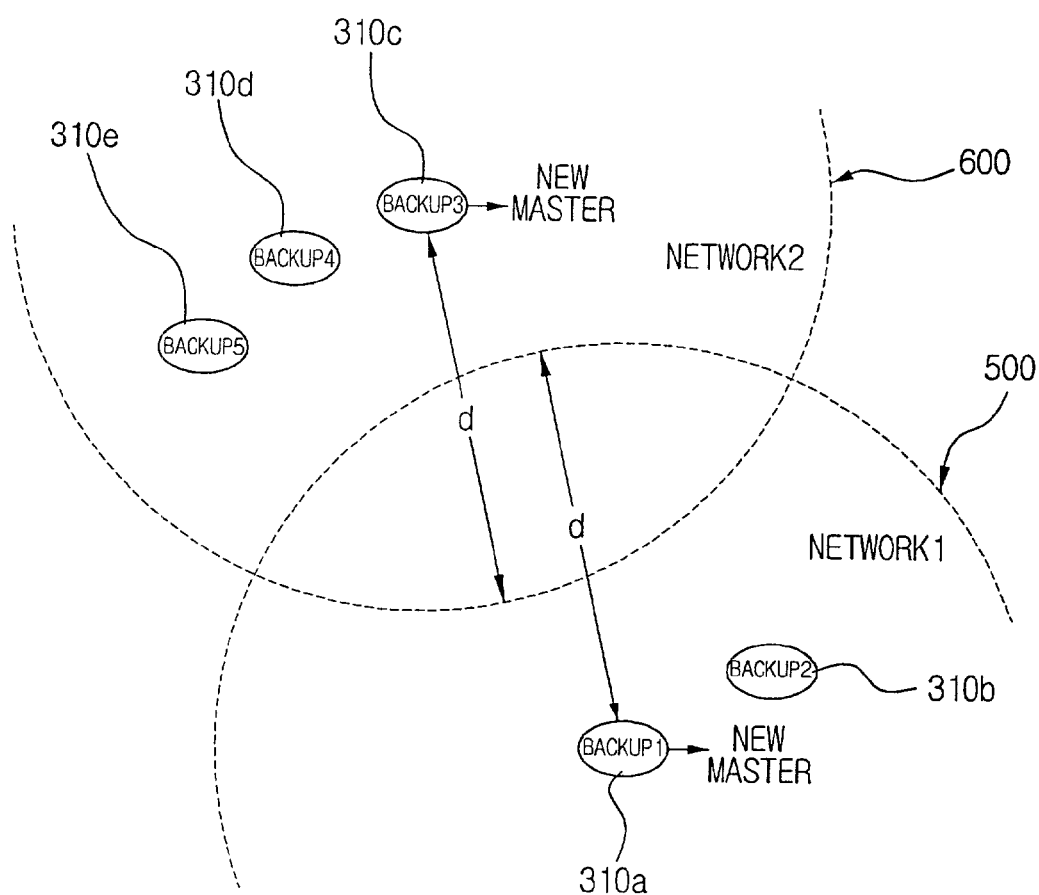
FIG. 11 illustrates the configuration of a network reconfigured after the network master of FIG. 10 disappears.

As shown in FIG. 5, before the network master 400 leaves the network operating region, all of the first through fifth backup master ranked network slaves 300 are distributed within the radio coverage distance d of the network 250. FIG. 9 shows a network reconfigured around the first ranked slave 300*b* BACKUP 1 after the network master 400 disappears. As shown in FIG. 9, the distance d between the fifth ranked slave 300*e* BACKUP 5 and the first ranked slave 300*b* BACKUP 1 is greater than the radio coverage distance d. In other words, as for the network 270, reconfigured after the network master 400 disappears, the fifth ranked slave 300*e* BACKUP 5 is located outside of the network 270. Accordingly, although the fifth ranked slave 300*b* BACKUP 5 attempts to establish connection with the first ranked slave 300*b* BACKUP 1 after the leaving of the preexisting network master 400 is recognized, the connection is unsuccessful and thus it cannot be a node of the new network 270. Accordingly, the fifth ranked slave 300*e* BACKUP 5 attempts connection with another Bluetooth equipped devices, or serves as a master in order to construct a new network. FIG. 10 illustrates the configuration of another network 280 with Bluetooth equipped devices and FIG. 11 illustrates the configuration of networks reconfigured after the network master 410 of FIG. 10 leaves the network operating region. Referring to FIG. 10, the network 280 consists of network master 410 and network slaves 310. The network slaves 310 have first to fifth backup master rank information. In FIG. 11, reference numeral 500 represents a first network where the first ranked slave 310*a* BACKUP 1 of FIG. 10 serves as a new master. Reference numeral 600 represents a second network reconfigured with the slaves located outside of the radio coverage distance d of the first Network 500. For the second network 600, among the slaves located outside of first network 500, the third ranked slave 310c BACKUP 3, which has a relatively higher priority, which is used to choose a new master, changed its role to a new master in order to construct the second network 600.

When the reconfiguration of a network is completed as mentioned above, optimization of transmission power between the new network master and the slaves is required.

As previously mentioned, the method of building up priority information about a backup master for use in selecting a new master of a network when a preexisting network master disappears, the method for designating a new master according to the backup master rank information, and the method for establishing connections between a new master and remaining slaves, when a preexisting network master leaves the network operating region, increases a probability of holding connection throughout the network.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. A method for building up backup master information, comprising the steps of:
   (a) receiving connection information from at least one of a plurality of slaves in a network, wherein the received connection information includes at least one of a received signal strength indication (RSSI) and link quality information, wherein the link quality information comprises an index of error rate in data transmission between a network master and each slave;
   (b) determining a priority of said at least one of the plurality of slaves to be used as a backup master, when a network master disappears, according to at least one of the RSSI and the link quality information included in the received connection information; and
   (c) announcing the determined priority to at least another one of the plurality of slaves prior to the network master disappearing.

2. The method of claim 1, wherein the steps (a) through (c) are repeated in a predetermined cycle.

3. The method of claim 1, wherein, in the step (b), if said at least one of the plurality of slaves has a higher RSSI than another one of the plurality of slaves, said at least one of the plurality of slaves is given a higher priority, which is used to choose a new network master.

4. The method of claim 1, wherein, in the step (b), if said at least one of the plurality of slaves has a higher link quality value than another one of the plurality of slaves, said at least one of the plurality of slaves is given a higher priority, which is used to choose a new network master.

5. The method of claim 1, wherein the network is a Personal Ad-hoc Network.

6. The method of claim 1, wherein in the step (c), the determined priority of the backup master is announced to the at least another one of the plurality of slaves, through a broadcasting channel.

7. A method for designating a new master of a network when a preexisting network master disappears, the method comprising the steps of:
   (a) determining at a slave whether the preexisting network master has disappeared;
   (b) if the preexisting network master has disappeared, checking a rank assigned to the slave by the preexisting network master which determined the rank based on connection information received from the slave by the preexisting network master, wherein the rank is used for choosing a new network master and is received before the disappearance of the preexisting network master; and
   (c) changing the slave to the new network master if it is determined that the rank is highest of any one assigned to a plurality of slaves,
   wherein the connection information received from the slave by the preexisting network master includes at least one of received signal strength indication (RSSI) and link quality information, the link quality information comprises an index of error rate in data transmission between the preexisting network master and each slave, and the preexisting network master determines the rank based on at least one of the received signal strength indication (RSSI) and the link quality information.

8. The method of claim 7, after the step (c), further comprising the step (d) of performing inquiry scan and page scan.

9. The method of claim 8, after step (d), further comprising the steps of:
   (e) determining whether a new device attempts to establish a connection through the network;
   (f) accepting a request of the new device for connection, requesting the new device to change to a role as a slave, and remaining as the new network master;
   (g) storing information of the new device, and announcing the information of the new network master and each of the plurality of slaves linked throughout the network, to each of the plurality of slaves linked throughout the network; and
   (h) checking for a change of a master mode if there is no connection request from the new device in step (e), returning to the step (d) when no change to the master mode is determined, and terminating the master mode when a change to the master mode is determined.

10. The method of claim 9, wherein, in the step (h), the change of the master mode is determined when a role of a device serving as the preexisting network master is changed to a role as one of the plurality of slaves, by a user, when a Bluetooth function of the preexisting network master is switched off, or when power of the preexisting network master is turned off.

11. The method of claim 7, wherein step (a) comprises the sub-steps of:
   (a1) checking a connection status with the preexisting network master;
   (a2) attempting to reconnect with the preexisting network master if disconnection is detected in sub-step (a1);
   (a3) checking whether reconnection with the preexisting network master is successful, and returning to the sub-step (a1) if the reconnection with the preexisting network master is successful; and
   (a4) determining whether the preexisting network master has disappeared, if reconnection with the preexisting network master is not established in sub-step (a3), and informing a host of the event as a "Disconnection Complete Event".

12. The method of claim 11, wherein the sub-step (a1) is repeated in a predetermined cycle while the connection with the preexisting network master remains.

13. A method for establishing a connection between a new master and a remaining plurality of slaves of a network when a preexisting network master disappears, the method comprising the steps of:
(a) checking whether the preexisting network master has disappeared;
(b) checking backup master rank information which is assigned to the slave by the preexisting network master which determined the backup master rank information based on connection information received by the preexisting network master from the slave, when it is determined that the preexisting network master has disappeared in the step (a);
(c) attempting to establish a connection with the new network master when it is determined that one of the remaining plurality of slaves does not have a highest priority, according to the backup master rank information; and
(d) remaining as one of the remaining plurality of slaves if a connection with the new network master is established in the step (c), wherein the connection information received from the slave by the preexisting network master includes at least one of received signal strength indication (RSSI and link quality information, the link quality information comprises an index of error rate in data transmission between the preexisting network master and each slave, and the preexisting network master determines the backup master rank information based on at least one of the received signal strength indication (RSSI) and the link quality information.

* * * * *